(No Model.)

S. M. BIXBY.
HANDLED BLACKING BOX.

No. 359,705. Patented Mar. 22, 1887.

Witnesses
T. W. Squel
R. W. Bishop

Inventor
Samuel M. Bixby
By his Attorney,
Earle H. Smith

UNITED STATES PATENT OFFICE.

SAMUEL M. BIXBY, OF NEW YORK, N. Y.

HANDLED BLACKING-BOX.

SPECIFICATION forming part of Letters Patent No. 359,705, dated March 22, 1887.

Application filed January 8, 1887. Serial No. 223,814. (No model.)

*To all whom it may concern:*

Be it known that I, SAMUEL M. BIXBY, of the city, county, and State of New York, have invented certain new and useful Improvements in Handled Blacking-Boxes, whereof the following is a specification.

My invention relates to blacking-boxes, particularly such as are used with a handle applied to the bottom thereof. The bottom of the box is made dishing in shape, with an encircling margin inclined upward toward the sides of the box. The bottom is also provided with protuberances for feet arranged at the sides of the handle. When a movable handle is used, it is preferably arranged to slide across the bottom, controlled by proper guides.

Figure 1:
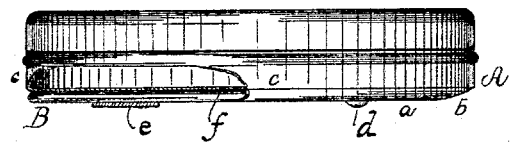
Figure 2:
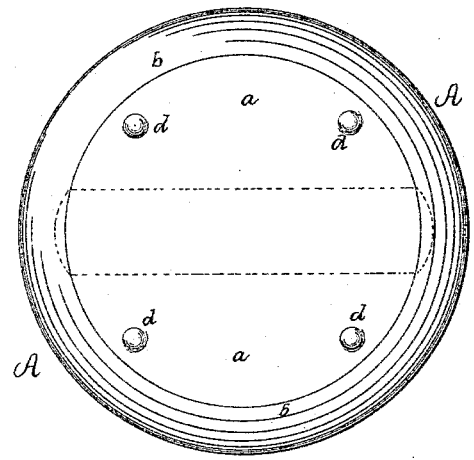
Figure 3:
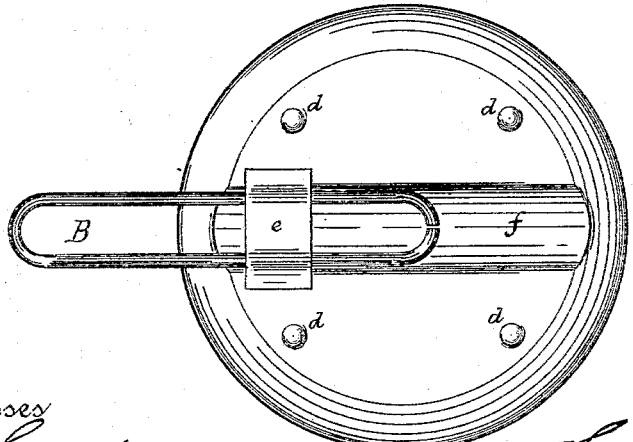

In the annexed drawings, which are designed to illustrate my improvement, Figure 1 is a side elevation of the box, partly in section. Fig. 2 is a view of the under side, showing the feet and place of the handle. Fig. 3 represents the improvement when embodying a movable handle.

A indicates the body of the box. The central area of the bottom is struck downward in dishing form, as at $a$, leaving a margin, $b$, inclined upward toward the sides $c$. This shape facilitates using out all the contents, and avoids leaving the ring of blacking usually remaining as waste around the corner of the box.

B indicates a handle for use in connection with the box, on the bottom thereof. Protuberances $d$ are made on or applied to the bottom for feet, and should project about the distance occupied by the prominence of the handle. The feet thus prevent the handle from interfering with the level of the box, and maintain the standing level thereof both in packing and in use. The simplest way of producing such feet is to strike out the said protuberances in the act of swaging and forming the bottom.

The handle, when movable, is preferably of the sliding kind, and in this instance is in the form of a loop or link, which is attached to the bottom by a suitable guide-piece, $e$. It may be placed on the outer surface; but in order not to have the feet too prominent I prefer to strike in a groove, $f$, across the bottom, for receiving the loop or link. Such groove is indented only in the struck-out portion of the bottom, and so allows the entire handle, when not in use, to be received within the diameter of the box, leaving the extreme ends of the link to set closely to the surface of the beveled margin $b$ aforesaid.

I do not restrict myself to the guide-piece $e$ for the means of attaching the handle, as such means will vary with the kind of handle adopted; and the feet are equally as useful, whether the handle employed be fixed to the box or made movable thereon.

The present invention differs from a box having a handle received in a recess beneath within a curtain formed by the sides of the box, since such boxes, being made with the bottom separate from the sides, are necessarily more expensive, whereas here the sides and bottom are in one piece.

I claim as my invention—

In a handled blacking-box, the combination of the dishing bottom, the groove crossing the same, and a movable handle sliding in the groove, substantially as set forth.

SAMUEL M. BIXBY.

Witnesses:
WM. APGAR,
V. N. HEENNANCE.